United States Patent [19]
Paine

[11] Patent Number: 5,868,029
[45] Date of Patent: Feb. 9, 1999

[54] METHOD AND APPARATUS FOR DETERMINING FLUID LEVEL IN OIL WELLS

[76] Inventor: Alan Paine, 535 W. Allen Ave., San Dimas, Calif. 91773

[21] Appl. No.: 839,466

[22] Filed: Apr. 14, 1997

[51] Int. Cl.[6] .................................................. G01F 23/22
[52] U.S. Cl. ............................ 73/298; 73/290 R; 73/302
[58] Field of Search .................................. 73/290 R, 296, 73/299, 301, 302, 298, 308, 309, 314

*Primary Examiner*—Max H. Noori
*Attorney, Agent, or Firm*—James E. Brunton

[57] ABSTRACT

A method and apparatus for continuously monitoring fluid level in an oil well, by measuring changes in the weight of the oil well tubing which result from changes in the buoyancy of the tubing caused by the rise and fall of fluid level within the oil well. In the apparatus of the invention, a transducer is either affixed to the downhole tubing of the oil well, or alternatively, is affixed to the drive head support structure of a well having a progressive cavity well pump. The transducer continuously senses changes in the weight of the tubing as the buoyancy of the tubing changes in proportion to the rise and fall of fluid level within the well. The transducer is preferably connected to a control unit which, in turn, is connected to the pump motor and which functions to automatically control the pump motor as a function of fluid level within the well.

23 Claims, 5 Drawing Sheets

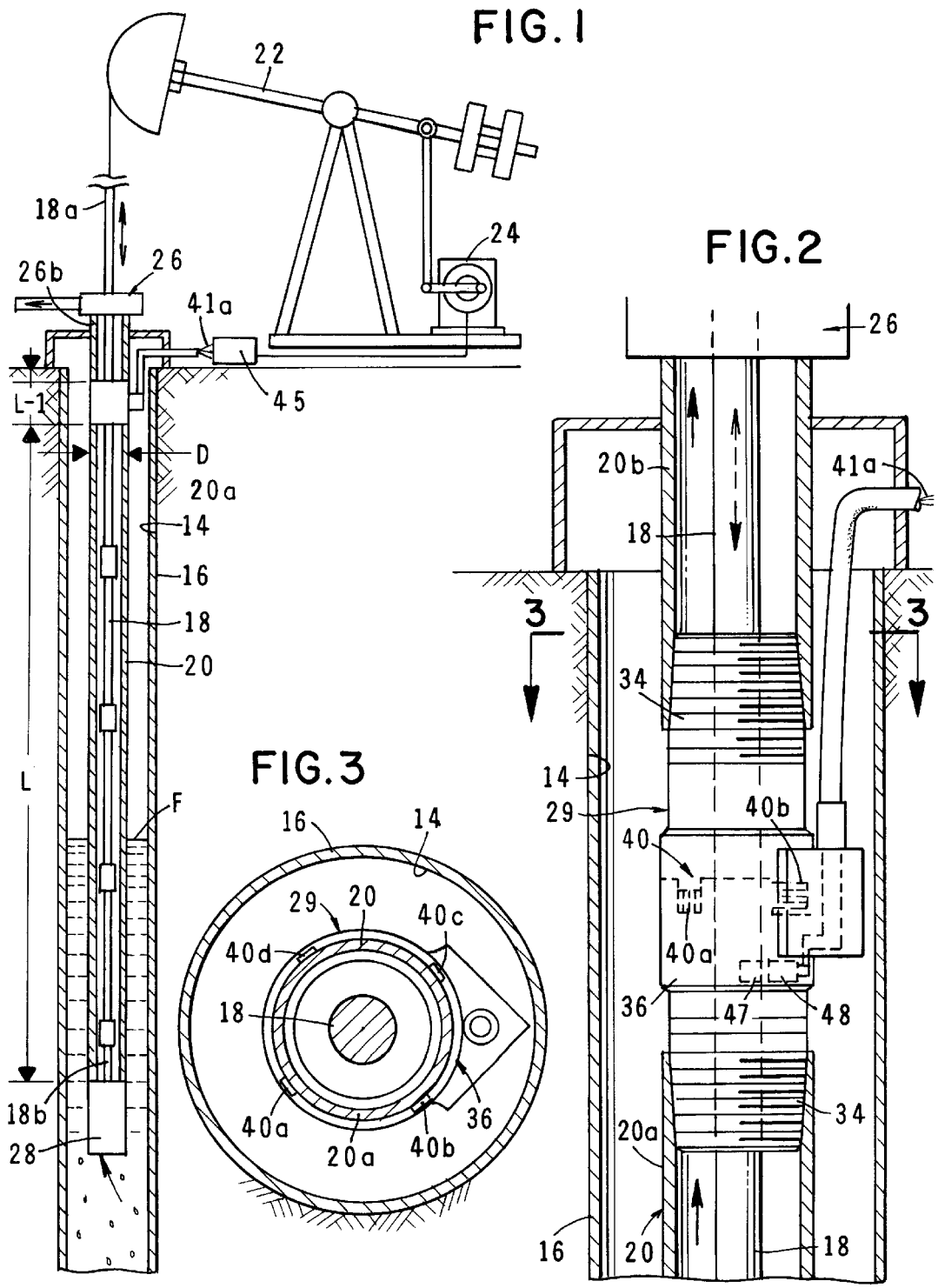

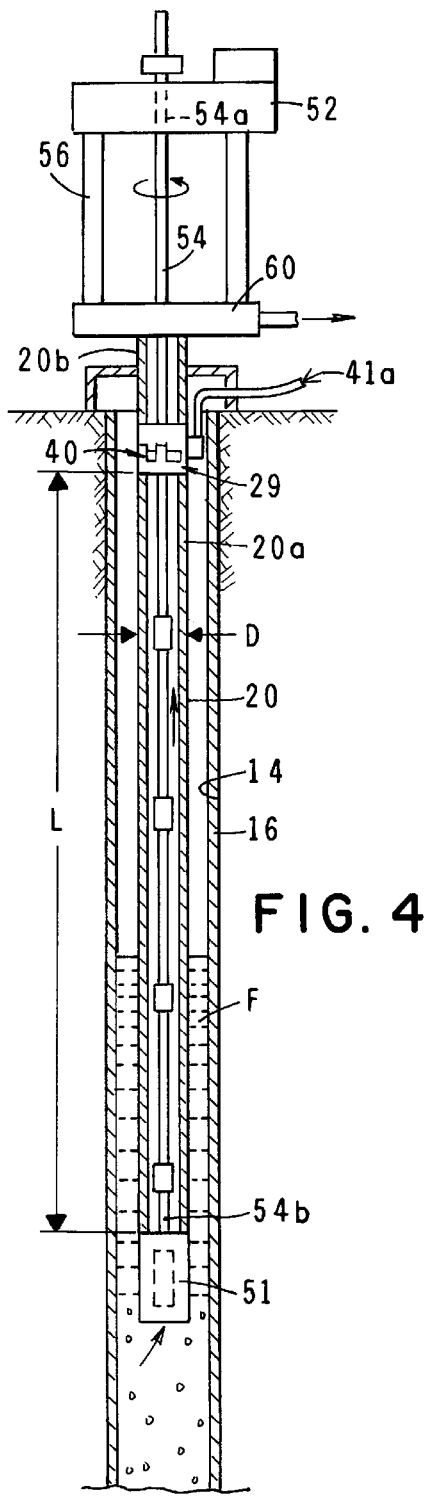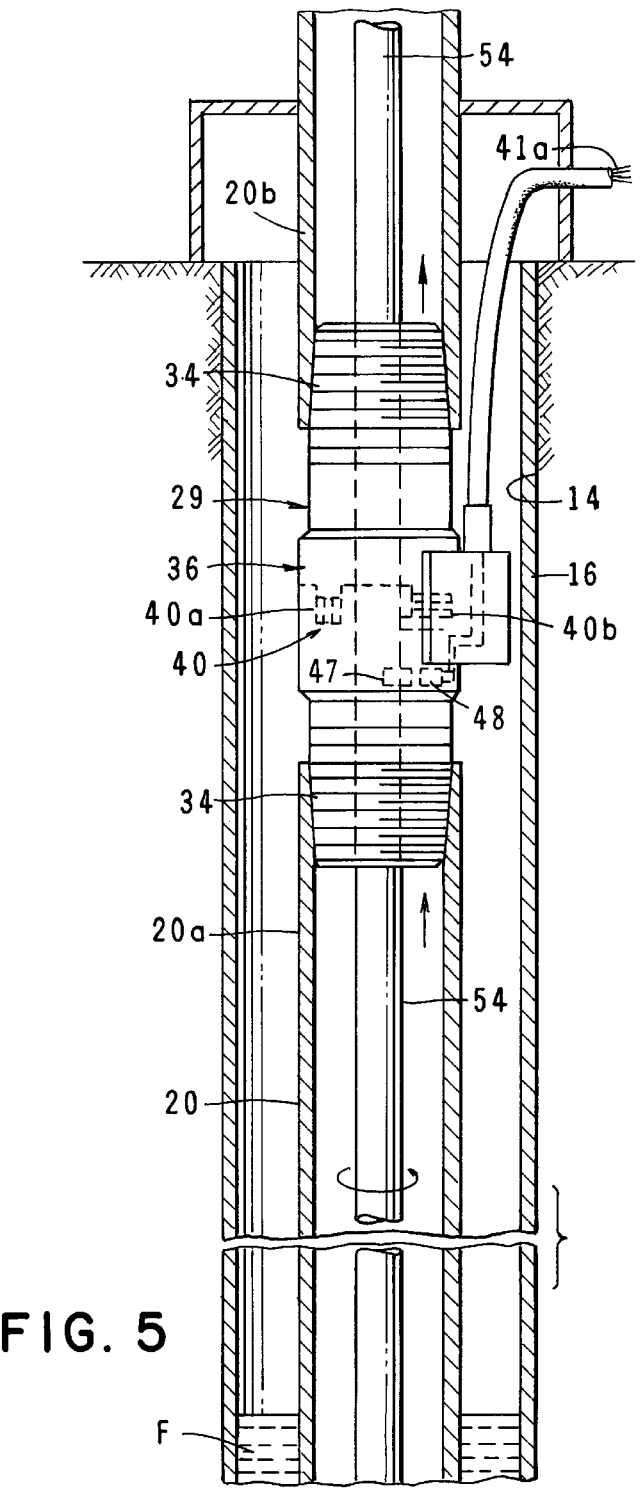
FIG. 4
FIG. 5

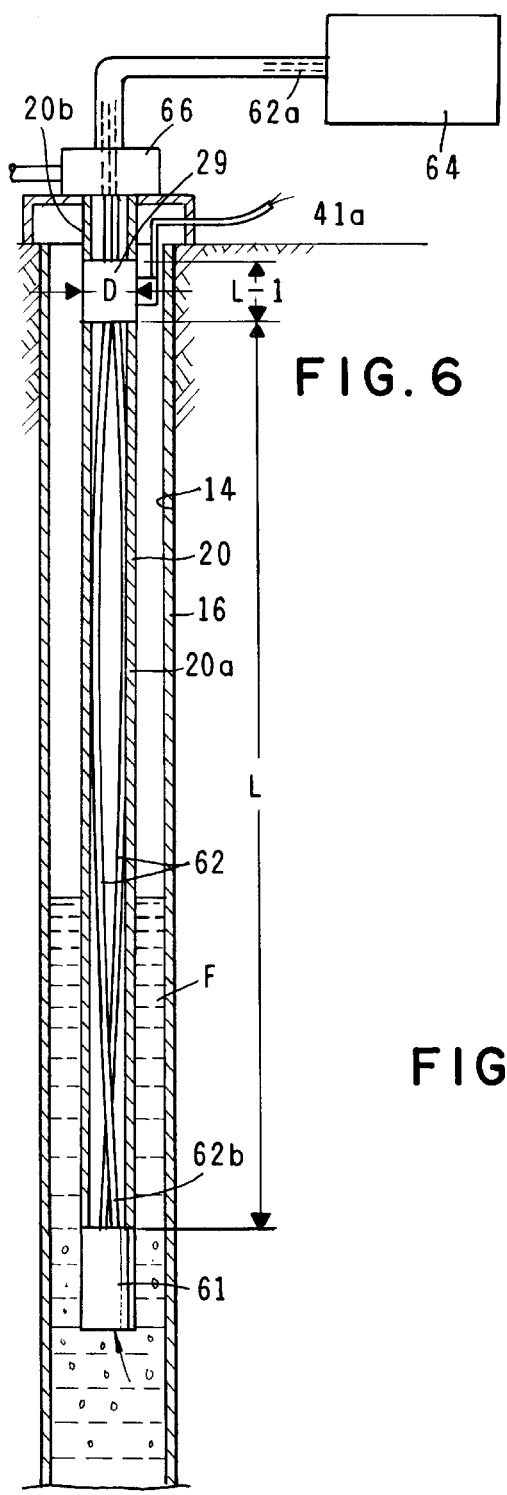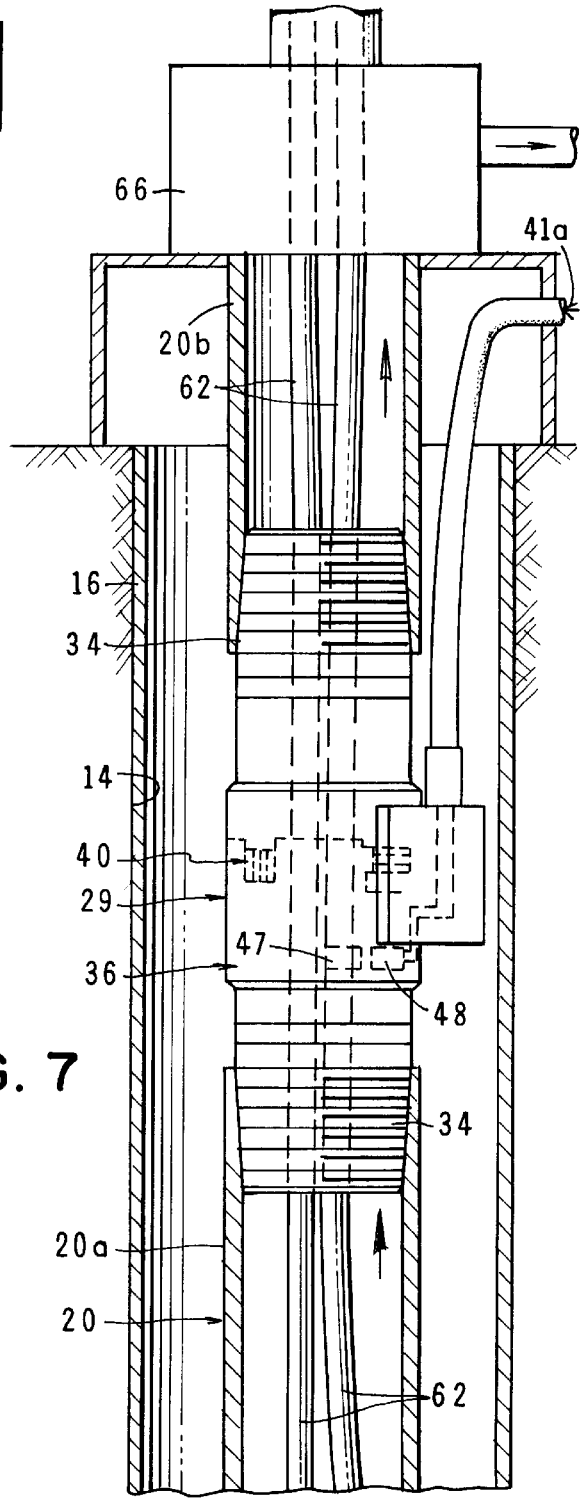

METHOD AND APPARATUS FOR DETERMINING FLUID LEVEL IN OIL WELLS

BACKGROUND OF THE INVENTION

1. Field of the Invention

The present invention relates generally to a method and apparatus for measuring fluid level in oil wells. More particularly, the invention is concerned with a novel sensor apparatus and the method of using the same for measuring the changes in weight of the tubing in an oil well which occur as a result of changes in buoyancy of the tubing due to the rise and fall of the fluid level within the well.

2. Description of the Prior Art

Oil field pumping units can be of several types. For example, a common type of unit is the so-called "sucker rod" apparatus which uses a standard walking beam coupled with a down hole sucker rod. Pumping units other than the "sucker rod" type use either a submersible pump and motor with power being supplied to the motor from the surface or a surface-mounted motor which drives a submersible rotary pump via an elongated drive shaft.

The oil well itself typically comprises a drilled bore which is lined with a steel casing. Within this casing is a down hole tubing which, in other than the submersible pump and motor type unit, carries either the sucker rod or the drive shaft which drives the impeller of the submersible pump. In the case of the submersible pump and motor type unit, the down hole tubing carries the cables which provide power to the submersible motor.

In any of the conventional prior art oil field pumping units, if the well runs dry or if the fluid level within the well drops significantly, the load on the pump motor will decrease causing the speed of the motor to rapidly increase. Accordingly, in wells wherein fluid levels vary during pumping, control means must be provided to either turn off the pump motor when the fluid level is low, or, alternatively, to control the speed of the motor to accommodate changes in load on the motor due to the rise or fall of fluid level within the well. Without such controls, substantial damage to the pump can occur. More particularly, in the case of the submersible pump and motor, if the motor is allowed to run in the absence of fluid, potentially devastating wear and tear on the mechanical parts of the pump can quickly occur. Retrieval of the damaged or destroyed pumping unit and its repair or replacement can be quite costly. Similarly, in surface-mounted motor units, which include a down hole rotary pump and impeller, operation of the pump, when the fluid level is too low can also result in substantial damage to the system.

In addition to protecting the oil well pump from running in the absence of fluid, speed control is also necessary for the efficient operation of the pump and to avoid energy waste. For example, if the fluid in the well is not being pumped fast enough due to a rapid rise in the fluid level, means for adjusting the stroke speed of the pump is highly desirable to maintain peak production. Conversely, if the rise in fluid level within the well slows, slowing of the stroke speed of the pump is desirable.

Various types of methods and apparatus for pump control in oil wells have been suggested in the past. The most common type of prior art control system involves the use of a load cell type device in conjunction with a pump controller which generates a well card. The well card typically monitors the condition of the well and is a visual depiction of oil well conditions. In operation of this type of system the controller periodically energizes the pump for a few cycles to determine if there is sufficient fluid within the well to warrant continued operation of the pump. If the system detects the absence of fluid, the pump will immediately be de-energized. If, on the other hand the system determines that ample fluid is available for pumping, the pump will be permitted to operate until the system senses the absence of sufficient fluid level within the oil well. In actual practice after a number of periodic energization and de-energization steps occur, a trend is established and the controller functions to automatically energize and de-energize the pump based on this established trend. However, if the well conditions change radically, a new trend must be established in order to maintain peak operating efficiency and to prevent damage to pumping system. Disadvantageously, prior to the establishment of the new trend, the pump may operate for several cycles without fluid to pump, thereby exposing the pump to damage. In addition to being somewhat inefficient, the prior art load cell system cannot be used in connection with surface mounted pump systems.

As will be better understood from the description which follows, the method and apparatus of the present invention provides continuous monitoring of the fluid level within the well and interfaces with controls that maintain the correct pumping speed at all times. Additionally, in accordance with the method of the present invention, should fluid not be available to the pump, the pump will be automatically de-energized until fluid levels are sufficient for the resumption of safe pumping.

The need for continuous and precise pump control is even more important when surface-mounted or progressive cavity pumps are used as distinguished from sucker rod-type pumps. Accordingly, many of these types of prior art pumps embody a torque transducer which measures load level on the pump and when a decrease in torque occurs on the impeller shaft, the pump is automatically de-energized. Again a trend is established as the pump controller energizes and de-energizes the pump under varying conditions of fluid level. However, due to the possibility of immediate and extreme damage to the pump in the progressive cavity pump systems, it is highly undesirable to allow the pump to start up even momentarily when the fluid level within the well is too low.

Advantageously, in accordance with the method of the present invention there is a continuous monitoring of fluid level within the well and simultaneous control of pump operation will positively prevent the pump from operating when the fluid level within the well is too low. Additionally, in accordance with the method of the present invention the stroke speed of the pump is continuously controlled so as to maintain proper pumping conditions as fluid levels rise and fall within the oil well.

Another widely used prior art method for determining fluid level in an oil well involves the use of a small capillary tube which is coupled with a pressure transducer located near the top of the tubing. With this type of system, the pressure transducer measures the rise and fall of fluid within the oil well as the pressure changes in the capillary tube. This continuous monitoring of the well conditions satisfactorily avoids starting of the pumps when the fluid level is too low and also can be interfaced with the controller that will adjust the pumping speed to accommodate a rise in fluid level within the well. However, due to the fact that a very long length of very costly capillary tubing is required, this type of prior art system is quite expensive to manufacture. Further, the fragile capillary tubing is easily damaged during installation and operation. Additionally, the small capillary tubing is prone to blockage which results in faulty pressure measurements by the pressure transducer associated with the capillary tubing. Disadvantageously, when the small and fragile capillary tubing is either blocked or damaged, a specialized crew is required to take remedial action which can be both time consuming and quite costly.

The novel method and apparatus of the present invention overcomes the drawbacks of the prior art capillary tubing systems while at the same time achieving superior results. Further, the apparatus of the present invention is considerably more economical to operate, is more reliable in operation, and does not require a special crew for installation and repair since all the measurements occur at a location proximate the surface of the ground.

SUMMARY OF THE INVENTION

It is an object of the present invention to overcome the substantial drawbacks of the prior art systems by providing a method and apparatus for continuously monitoring fluid level in an oil well, by measuring the changes in the weight of the oil well tubing which result from changes in the buoyance of the tubing caused by the rise and fall of fluid level within the oil well.

Another object of the invention is to provide a method and apparatus of the aforementioned character which can be used to control both sucker rod type pumps as well as progressive cavity type pumps.

Another object of the invention is to provide a method for continuously controlling pump operation by monitoring the buoyancy of the oil well tubing within the oil well on a continuous basis. More particularly, it is an object of the invention to provide a method as described in the preceding paragraphs which not only protects the pump from damage, but also functions to achieve peak productivity by automatically increasing pump speed as the fluid level within the well rises.

By way of summary, these and other objectives are achieved by the method and apparatus of the present invention wherein a transducer, which is either applied to the down hole tubing of the oil well, or alternatively, is affixed to the drive head support structure of a progressive cavity well pump continuously senses changes in the weight of the tubing as the buoyancy of the tubing changes in proportion to the rise and fall of fluid level within the well. More particularly, because of the difference between the density of oil and air, as the fluid level within the well rises, the tubing becomes lighter. The strategically mounted transducer of the apparatus of the invention continuously senses this change in weight and provides real-time output signals to a cooperatively associated controller which, in turn, controls the operation of the pump in accordance with the output signals. Therefore, as the fluid level within the well decreases, the pump tubing becomes less buoyant and the resultant increase in weight is sensed by the transducer. Signals produced by the transducer are then transmitted to the controller which functions to de-energize the pump motor when the fluid level drops below the location of the pump. Conversely, as the fluid levels within the well increase, the pump tubing becomes more buoyant (lighter) and this change in weight is once again sensed by the transducer which signals the pump to begin pumping at a rate consistent with the increase in buoyancy of the tubing caused by the increase in fluid level within the well.

BRIEF DESCRIPTION OF THE DRAWINGS

FIG. 1 is a generally diagrammatic view of a conventional oil well pumping apparatus which embodies a sucker rod type pump, the well and tubing within the well being shown in cross section to better illustrate the configuration of the well and the nature of the pumping apparatus.

FIG. 2 is a greatly enlarged, cross-sectional view of the upper portion of the oil well and pumping apparatus shown in FIG. 1. Showing in greatly enlarged form, the transducer component of the apparatus of the invention which is interconnected with the downhole tubing.

FIG. 3 is a cross-sectional view taken along lines 3—3 of FIG. 2.

FIG. 4 is a drawing of an oil well and pumping system which embodies a progressive cavity well pumping device as distinguished from the sucker rod pumping device shown in FIG. 1. Once again, the well and the well tubing is shown in cross section to better illustrate the configuration thereof.

FIG. 5 is an enlarged fragmentary view of the upper portion of the apparatus shown in FIG. 4 and illustrating one form of the transducer of the invention interconnected with the well tubing.

FIG. 6 is a view of a conventional oil well and pumping system which embodies a submersible pump and motor for use in pumping oil from the oil well showing the transducer interconnected with the downhole tubing which carries the electrical cables which provide power to the motor.

FIG. 7 is an enlarged fragmentary, cross-sectional view of the upper portion of the oil well and pumping system shown in FIG. 6 and, once again, showing one form of the transducer device of the invention installed within the oil well tubing.

DESCRIPTION OF THE INVENTION

Figure 8:
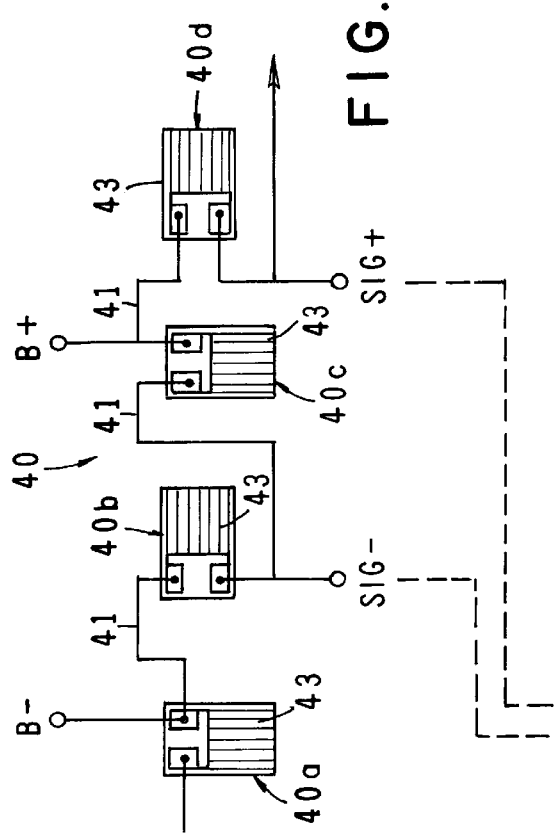
FIG. 8 is an enlarged, generally diagrammatic view of one form of the transducer of the invention showing the manner of placement of the strain gages of the device about the circumference of the transducer-carrying coupler and the manner of interconnection of the individual strain gages which make up the strain gage array.

Referring to the drawings and particularly to FIGS. 1 through 3, one form of the apparatus of the invention is there shown in use with a conventional type of "sucker rod" oil well. The oil well comprises a downhole bore 14 which is lined with a steel oil well casing 16. Extending downwardly of casing 16 is a sucker rod 18 which is housed within a tubing system comprising an elongated conduit or tube 20 which includes a lower segment 20a having a length "L" and a diameter "D". As depicted in FIG. 1, conduit 20 extends downwardly within the bore 14 and is normally partially surrounded by fluid "F" which rises and falls within the well.

Sucker rod 18 is interconnected with a pump jack 22 of conventional construction having a driving motor 24. Sucker rod 18 extends through a tubing head 26 of conventional construction and is connected proximate its upper end 18a with pump jack 22. Connected proximate the lower end 18b of sucker rod 18 is a conventional sucker rod pump 28.

Interconnecting segments 20a and 20b of length of conduit 20 and forming a part of the tubing system of the invention is an intermediate coupling portion shown here as a coupler 29, which has a length "L-1" and a diameter "D" (see FIG. 1). In the form of the invention shown in FIGS. 1 through 3, the sensor means of the invention is operably interconnected with coupler portion, or coupler 29. The sensor means functions to sense physical changes in the tubing system and to generate at least one signal corresponding to a physical change in the tubing system, which is dictated by the sensor means, as the fluid level within the well rises and falls.

As best seen by referring to FIGS. 2 and 3, the sensor means of the form of the invention there shown comprises transducer means which is connected to the coupler 29 which is interposed between lower segment 20a of tubing 20 and upper segment 20b thereof (FIG. 2). More particularly, as best seen in FIG. 2, coupler 29 comprises an elongated tubular member having external threads 34 formed on either end thereof and an enlarged diameter central body portion 36. As shown in FIG. 2, the sensor means of the invention, which here comprises a strain gage array 40, is interconnected with body portion 36. As best seen by also referring to FIG. 8, strain gage array 40 comprises four interconnected strain gages 40a, 40b, 40c, and 40d respectively.

While various types of strain gages can be used in accomplishing the method of the invention, strain gages 40a, 40b, 40c, and 40d are preferably foil-type strain gages which are constructed from very thin, precision etched foil. The deformation of the foil is repeatable when exposed to various temperature ranges and as it is periodically stretched or compressed. Foil type strain gages of the character here employed are well known in the art and are readily commercially available from sources such as Micro Measurements, Inc. of Raleigh, N.C.

Figure 9:
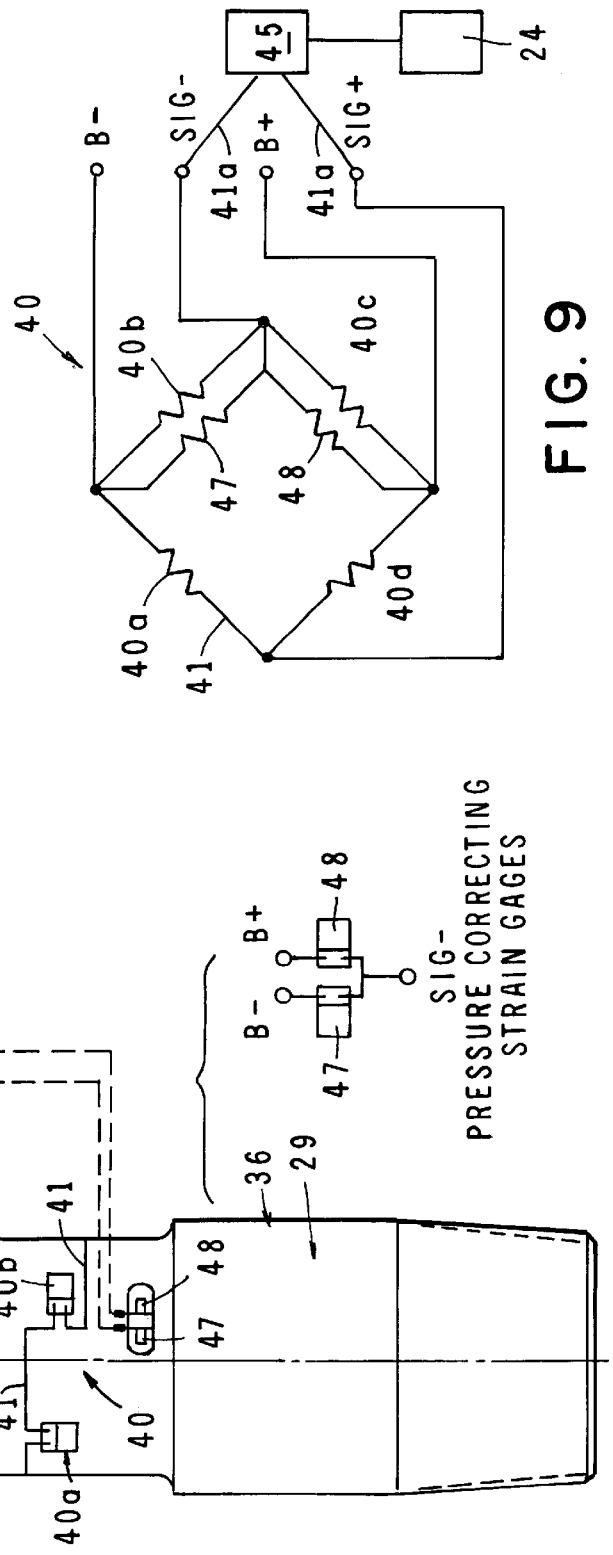
FIG. 9 is a generally schematic view of one form of strain gage array showing the manner of interconnection of the individual strain gages.

As indicated in FIG. 9, the individual strain gages are preferably arranged in a wheatstone bridge configuration with interwiring 41 interconnecting the individual strain gages. Interwiring 41, which is preferably etched on the same foil as that upon which the individual strain gages are etched, is interconnected with electrical leads 41a which extend from the strain gage array to the exterior of the well. In a conventional manner, the etched foil is laminated to a substrate 43 (FIG. 8) that comprises a flexible material such a mylar or polyamide so that the strain imposed by the structure being measured on the substrate will be transferred directly to the foil. In the preferred form of the invention, the array of gages 40a, 40b, 40c, and 40d and the interwiring thereof is arranged in a poisson configuration of the character illustrated in FIG. 9.

As indicated in FIGS. 3 and 8, the strain gages are equally spaced around the circumference of central portion 36 of coupler 29 and are affixed thereto by any suitable means such as adhesive bonding. With the strain gages suitably affixed to coupler 29, any strain imposed on the coupler will cause the strain gages which are bonded thereto to elongate or compress. It is well known that metals generally change in resistance when this occurs. Accordingly, as a given strain gage is minutely stretched, the resistance increases and, vice versa, when the strain gage is compressed, the resistance decreases. In a wheatstone bridge construction of the character shown in FIG. 9, when all of the strain gages are identical in there omic values and, when a direct current is applied as, for example, across strain gages 40a and 40b, a signal output of zero volts will result across strain gages 40b and 40c. As is well understood by those skilled in the art, a change in any one leg of the wheatstone bridge will result in an output proportional to the change. Therefore, resistance changes in opposite arms of the wheatstone bridge allow current flow which can be used to generate and transmit signals to a controller 45 (FIG. 9). To correct for pressure changes in tubing 20, additional strain gages 47 and 48 are bonded to coupler 29 and are interconnected with the strain gage array in the manner shown in FIGS. 8 and 9. The operation and methods of interconnection of the pressure correcting strain gages 47 and 48 are well known to those skilled in the art.

With the construction shown in FIGS. 8 and 9 of the drawings, it is apparent that the resistance of the strain gages 40a, 40b, 40c, and 40d which circumscribe coupler 29 will change as physical changes occur in the coupler. For example, since segment 20a of tubing 20 if threadably connected to coupler 29 in the manner shown in FIG. 2, changes in the apparent weight of segment 20a will be reflected by proportionate physical changes in the coupler and in the tubing at a location proximate its point of interconnection with the coupler. More particularly, and by way of example, if segment 20a of the tubing is suspended in air from coupler 29, measurable internal stresses on the coupler will result, which stresses will cause minute changes in the length and diameter of the tubing as well as in the length and diameter of the coupler. These changes will, of course, cause a change in resistance to the strain gages which are connected to the coupler and a concomitant change in current flow through leads 41a. Accordingly, with segment 20a of the tubing extending downwardly of casing 16, if the fluid in the well is at a level below the lower extremity of the segment, physical changes in the coupler will occur which corresponding to the actual weight of the length "L" of segment 20a. However, if the fluid level within the well rises, as, for example, as shown in FIG. 1, a portion of segment 20a will be immersed within the fluid and the tubing will be buoyed upwardly. This buoyancy will result in an apparent loss of weight in segment 20a which, in turn, will result in a change in the stresses imposed upon the tubing and upon the coupler to which it is attached. The physical changes in the tubing and coupler will be sensed by the sensor means or strain gage array of the invention and will be evidenced by a change in current flow through the device.

As the level of fluid "F" within casing 16 continues to rise, segment 20a will be further buoyed upwardly, thereby further decreasing the apparent weight of segment 20a. Conversely, as the level of fluid within the well falls, the apparent weight of tubing segment 20a will increase in direct proportion to the buoyance exerted on the segment. These changes in the apparent weight of the length of tubing 20a will, of course, cause changes in the stresses imposed on coupler 29, which stresses will be precisely sensed by the sensor means or strain gage array and can be directly correlated to the level of fluid within the well. When the output of the strain gage array is connected to controller 45 and when the controller is appropriately interconnected with motor 24 in the manner shown in FIG. 9, the operation of motor 24 can be precisely controlled as a function of the rise and fall of the level of the fluid "F" within casing 16.

In accordance with the method of the present invention, the resistance of the strain gages of the sensor means can be determined and recorded when the tube segment 20a of the conduit 20 is supported only in air, that is when the fluid level in the well is lower than the bottom extremity of segment 20a. Similarly, the resistance of the strain gage can be determined and recorded when segment 20a of the coupler is totally or partially submerged.

This done the resistance of the strain gages at intermediate fluid levels within the well can be determined either empirically or through actual measurement. Using these readings, those skilled in the art will have no difficulty in correlating the resistance of the strain gages with fluid level with the bore of the well. In a manner well understood by those skilled in the art, the sensor means can be operably interconnected with the controller 45 so that the speed of motor 24 can automatically be regulated and so that the motor can be stopped and started as a function of fluid levels within the well. For example, if readings on the sensor means correspond to the initial set of readings taken when the full weight of segment 20a was supported by the well, the controller will be programmed to automatically de-energize the motor since this reading means that the level of fluid in the well is below the pump.

Referring next to FIGS. 4 and 5, the apparatus of the invention is shown being used in connection with a downhole rotary pump type of pumping system. In this system, the rotary pump 51 is driven by a surface mounted motor 52 via a drive shaft or rod 54. The oil well itself is similar in character to that shown in FIG. 1 and comprises a downhole bore 14 which is lined with a steel oil well casing 16. As best seen in FIG. 4, drive shaft 54 is housed within a tubing system comprising an elongated tube 20 similar to that previously described which includes a lower segment 20a having a length "L" and a diameter "D". As depicted in FIG. 4, tube segment 20a extends downwardly within the bore 14 and normally is partially surrounded by fluid "F" which rises and falls within the well. Because of the similarity between the oil well and the tubing system shown in FIG. 4 and that shown in FIG. 1, like numbers are used in FIGS. 4 and 5 to identify like components. Drive rod 54 is of conventional construction and is supported by a support structure 56 which here also forms a part of the tubing system and which functions to support driving motor 52. The drive rod or shaft 54 extends through a tubing head 60 of conventional construction and is drivably connected proximate its upper end 54a with drive motor 52. The lower end 54b of the drive shaft is, of course, connected to the downhole rotary pump 51.

Disposed intermediate segments 20a and 20b of tubing 20 is a coupler 29 to which the sensor means of the invention is interconnected. Coupler 29 as well as the sensor means, are identical in construction and operation to those previously described in connection with FIGS. 1 through 3. As before, the sensor means functions to sense physical changes in the tubing system of the invention and is designed to generate at least one signal corresponding to a physical change in the tubing system as the fluid level within the well rises and falls. As before, the sensor means of the invention comprises transducer means which is connected to coupler means or coupler 29 in the manner previously described. Coupler 29 is interposed between lower segment 20a of tubing 20 and upper segment 20b thereof and comprises an elongated tubular member of the identical character previously described. Reference should be made to FIGS. 8 and 9 which illustrate the manner of interconnection of the strain gage array 40 of the sensor means with body portion 36 of the coupler 29.

As previously discussed, with segment 20a of the tubing extending downwardly of casing 16, if the fluid in the well is at a level below the lower extremity of the segment, physical changes in the coupler will occur which corresponding to the actual weight of the length "L" of segment 20a. However, if the fluid level within the well rises, as, for example, as shown in FIG. 4, a portion of segment 20a will be immersed within the fluid and the tubing will be buoyed upwardly. This buoyancy will result in an apparent loss of weight in segment 20a which, in turn, will result in a change in the stresses imposed upon the tubing and upon the coupler to which it is attached. The physical changes in the tubing and coupler will be sensed by the sensor means or strain gage array of this form of the invention and will be evidenced by a change in current flow through the device.

As the level of fluid "F" within casing 16 continues to rise, segment 20a will be further buoyed upwardly, thereby further decreasing the apparent weight of segment 20a. Conversely, as the level of fluid within the well falls, the apparent weight of tubing segment 20a will increase in direct proportion to the buoyance exerted on the segment. These changes in the apparent weight of the length of tubing 20a will, of course, cause changes in the stresses imposed on coupler 29, which stresses will be precisely sensed by the sensor means or strain gage array and can be directly correlated to the level of fluid within the well. When, as before, the output of the strain gage array is connected to a suitable controller such as a controller 45 and when the controller is appropriately interconnected with motor 52, the operation of motor can be precisely controlled as a function of the rise and fall of fluid within the well.

Turning now to FIGS. 6 and 7, the apparatus of the invention is shown being used in connection with an oil well system embodying a submergible rotary pump with motor attached. In this well system, the rotary pump and motor subassembly 60 is mounted downhole of a well which is similar in character to that shown in FIGS. 1 and 4. More particularly, as before, the well comprises a downhole bore 14 which is lined with a steel oil well casing 16. As best seen in FIG. 6, the electric power cables 62 which drive motor subassembly 60 extend from a surface mounted power source 64 downwardly within a tubing system comprises a conduit 20 similar to that previously described which includes a lower segment 20a having a length "L" and a diameter "D". As depicted in FIG. 6, tube segment 20a of conduit 20 extends downwardly within the bore 14 and normally is partially surrounded by fluid "F" which rises and falls within the well. Because of the similarity between the oil well and the tubing system shown in FIG. 6 and that shown in FIGS. 1 and 4, like numbers are used in FIGS. 6 and 7 to identify like components. The power cables 62 extend through a tubing head 66 of conventional construction and are connected proximate their upper ends 62a with power source 64, which may be a conventional type of high voltage supply unit. The lower end 62b of the cables are, of course, connected to the motor of the downhole rotary pump and motor assembly 60.

Disposed intermediate segments 20a and 20b of tubing 20 is a coupler 29 to which the sensor means of the invention is interconnected. Coupler 29 as well as the sensor means, are identical in construction and operation to those previously described in connection with FIGS. 1 through 5. As before, the sensor means functions to sense physical changes in the tubing system in the exact manner as previously described. Accordingly, the details of the construction and operation of the sensor means will not be repeated here.

Figure 11:
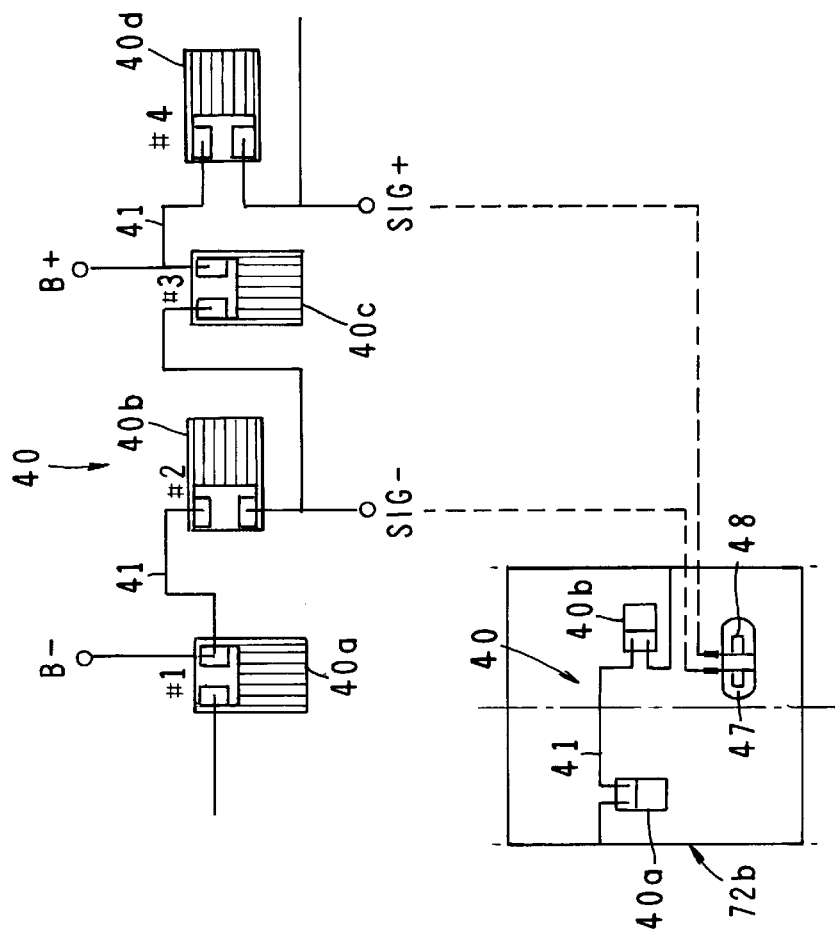
FIG. 11 is a generally schematic view of the form of strain gage array shown in FIG. 10 illustrating the manner of interconnection of the strain gages to one column of the drive shaft support structure.
Figure 10:
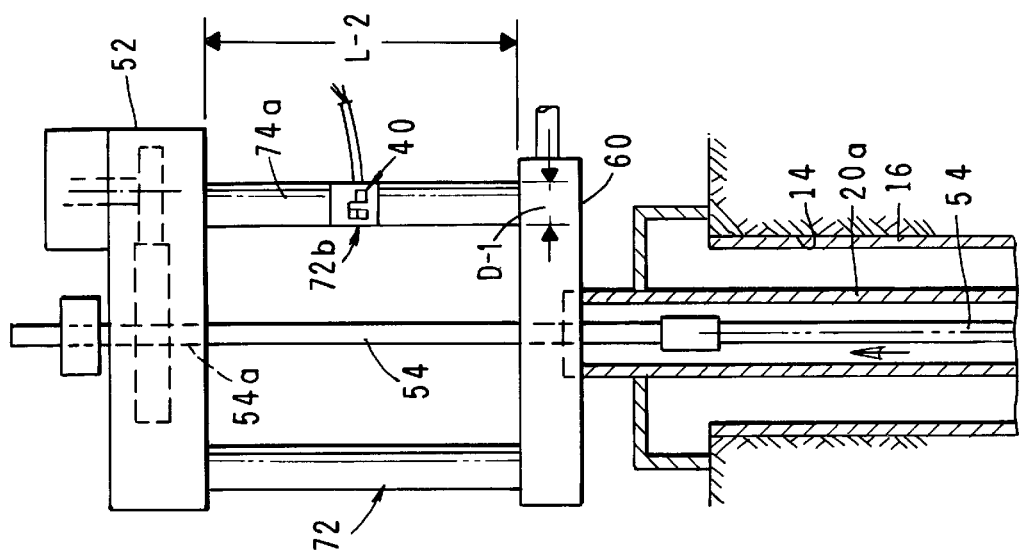
FIG. 10 is an enlarged fragmentary view of the upper portion of the pumping system similar to that shown in FIG. 4, but illustrating an alternate form of the apparatus of the invention wherein the transducer is mounted on the support structure which holds the drive shaft in tension.

Turning lastly to FIGS. 10 and 11, an alternate form of the invention is there shown being used in connection with a downhole rotary pump type of pumping system of the character shown in FIGS. 3, 4 and 5. As previously described in this system, the rotary pump 51 is driven by a surface mounted motor 52 via a drive shaft or rod 54. The oil well itself is similar in character to that shown in FIGS. 4 and 6, and comprises a downhole bore 14 which is lined with a steel oil well casing 16. As before, drive shaft 54 is housed within a tubing system comprising an elongated continuous conduit or tube 70. Continuous conduit, or tube 70, extends downwardly within the bore 14 and normally is partially surrounded by fluid "F" which rises and falls within the well. Because of the similarity between the oil well and certain aspects of the tubing system shown in FIG. 4, like numbers are used in FIGS. 10 and 11 to identify like components. Drive rod 54 is of conventional construction and is supported by a support structure 72 which forms a part of the tubing system of the invention and which functions to support driving motor 52. The drive rod or shaft 54 extends through a tubing head 60 of conventional construction and is drivably connected proximate its upper end 54a with drive motor 52. The lower end 54b of the drive shaft is, of course, connected to the downhole rotary pump 51 (not shown in FIG. 10, but shown in FIG. 4).

Unlike the forms of the invention earlier described herein, the sensor means of the invention, rather than being connected to a coupler member such as coupler 29, is connected to one of the vertical supporting columns of the support structure 72, such as column 72a. As before, the sensor means functions to sense physical changes in the tubing system of the invention and, more particularly, in the structural support portion of the tubing system, and is designed to generate at least one signal corresponding to a physical change in the system as the fluid level within the well rises and falls. Once again, the sensor means of the invention comprises transducer means which is here connected to the central portion 72b of support column 72a in the manner best seen in FIG. 11. Reference should also be made to FIG. 9, which illustrates the manner of interconnection of the strain gages which comprise the strain gage array 40 of the sensor means.

In the construction illustrated in FIGS. 4 and 10 of the drawings, the support structure 72 functions to continuously hold the drive shaft 54 in tension. Accordingly, the vertical columns of the structure, including column 72a, are continuously in compression with the tubing head 60 of the structure supporting the downwardly extending conduit or tube 70 which surrounds the drive shaft. With tube 70 extending downwardly of casing 16, if the fluid in the well is at a level below the lower extremity of the tube, physical changes in the support structure, and particularly in column 72a, will occur which corresponding to the actual weight of the length of tube 70. However, if the fluid level within the well rises, a portion of the tube 70 will be immersed within the fluid and will be buoyed upwardly. This buoyancy will result in an apparent loss of weight in tube 70 which, in turn, will result in a change in the compression stresses imposed on column 72a by the downwardly extending tube. The physical changes in column 72a will, of course, be sensed by the sensor means or stain gage array of this form of the invention and will be evidenced by a change in current flow through the device. For example, where column 72a has a length L-2 and a diameter D-1, an increase in compression on the column will cause a slight increase in diameter and a slight decrease in length. Conversely, a decrease in the compressive forces exerted on the column will cause a corresponding decrease in diameter and an increase in length.

As the level of fluid "F" within casing 16 continues to rise, tube 70 will be further buoyed upwardly, thereby further decreasing the apparent weight of the tube. Conversely as the level of fluid within the well falls, the apparent weight of tube 70 will increase in direct proportion to the buoyance exerted on the tube. These changes in the apparent weight of tube 70 will, of course, cause changes in the stresses imposed on column 72a, which stresses will be precisely sensed by the sensor means or strain gage array and can be directly correlated to the level of fluid within the well. When, as before, the output of the strain gage array is connected to a suitable controller such as a controller 45, and when the controller is appropriately interconnected with motor 52, the operation of the motor can be precisely controlled in the manner previously described herein, as a function of the rise and fall of fluid within the well.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A method for determining fluid level within a well in which fluid level varies during the pumping of the fluid by a motor driven pump comprising a drilled bore and a tubing system, including an elongated conduit, extending downwardly into fluid contained within the well and at least partially surrounding the conduit as the fluid level rises and falls within the well, the conduit comprising first and second segments interconnected by a coupling portion, the method comprising the step of sensing at least one physical change in the coupling portion of the tubing system as the fluid level within the well rises and falls.

2. A method as defined in claim 1 including the further step of varying the speed of the motor upon sensing a physical change in said coupling portion of the tubing system as the fluid level within the well rises and falls.

3. A method as defined in claim 1 including the step of sensing a change in the length and diameter of the said coupling as the fluid level within the well rises and falls.

4. A method for controlling pumping of fluid from a well in which fluid level varies during pumping with a motor driven pump, the well comprising a bore and a tubing system including an elongated conduit extending into the fluid contained within the bore, the conduit comprising first and second segments interconnected by a coupling portion, the method comprising the steps of:

(a) sensing a physical change in the coupling portion of the tubing system; and
    (b) varying the speed of the motor upon sensing said physical change.

5. An apparatus for use in a well in which fluid level varies during the pumping of fluid from the well by a motor-driven pump, the well being of the character having a drilled bore, said apparatus comprising:

(a) a tubing system, including an elongated conduit extending downwardly within the bore into fluid contained within the well and surrounding said conduit upon the rise and fall of fluid level within the well, said conduit comprising first and second segments interconnected by a coupling portion; and
    (b) sensor means for sensing physical changes in said coupling portion of said tubing system and for generating at least one signal corresponding to a physical change in said tubing system as the fluid level within the well rises and falls.

6. An apparatus as defined in claim 5 in which said sensor means comprises transducer means connected to said coupling portion for sensing physical changes in said coupling portion as the fluid level within the well rises and falls.

7. An apparatus as defined in claim 5 further including controller means operably associated with said sensor means for controlling the speed of the motor in response to a physical change in said coupling portion of said tubing system being sensed by said sensor means.

8. An apparatus as defined in claim 7 in which said sensor means comprises transducer means connected to said coupling portion of said tubing system for sensing physical changes therein.

9. An apparatus as defined in claim 8 in which said transducer means comprises a plurality of strain gages connected to said coupling portion of said tubing system.

10. An apparatus for use in a well in which fluid level varies during the pumping of fluid from the well by a motor-driven pump, the well being of the character having a drilled bore, said apparatus comprising:

(a) a tubing system, including an elongated conduit extending downwardly within the bore into fluid contained within the well and surrounding said conduit upon the rise and fall of fluid level within the well; said conduit comprising first and second tube segments and a coupler interconnecting said first and second tube segments; and (b) sensor means connected to said coupler for sensing physical changes in said coupler and for generating at least one signal corresponding to a physical change in said coupler as the fluid level within the well rises and falls.

11. An apparatus as defined in claim 10 in which said sensor means comprises transducer means connected to said coupler for sensing physical changes in said coupler as the fluid level within the well rises and falls.

12. An apparatus as defined in claim 10 further including controller means operably associated with said transducer means for controlling the speed of the motor in response to a physical change in said coupler being sensed by said sensor means.

13. An apparatus as defined in claim 12 in which said transducer means comprises a plurality of strain gages interwired in a poisson configuration.

14. A method for determining fluid level within a well in which fluid level varies during the pumping of the fluid by a motor driven pump comprising a drilled bore and a tubing system, including an elongated conduit, extending downwardly into fluid contained within the well and at least partially surrounding the conduit as the fluid level rises and falls within the well, the conduit comprising first and second lengths of tubing interconnected by a coupler having a length and a diameter, the method comprising the step of measuring stresses imparted to said coupler as the fluid level within the well rises and falls.

15. A method for controlling pumping of fluid from a well in which fluid level varies during pumping with a motor driving pump, the well comprising a bore and a tubing system including an elongated conduit extending into the fluid contained within the bore, said conduit comprising first and second tubing segments interconnected by a coupler, the method comprising the steps of:

(a) sensing a change in the length of said coupler of said tubing system; and (b) stopping the motor upon sensing said change in the length of said coupler.

16. An apparatus for use in a well in which fluid level varies during the pumping of fluid from the well by a motor-driven pump, the well being of the character having a drilled bore, said apparatus comprising:

(a) a tubing system, including an elongated conduit extending downwardly within the bore into fluid contained within the well and surrounding said conduit upon the rise and fall of fluid level within the well, said conduit comprising first and second tube segments connected by a coupler; and (b) sensor means for sensing physical changes in said tubing system and for generating at least one signal corresponding to a physical change in said tubing system as the fluid level within the well rises and falls, said sensor means comprising transducer means connected to said coupler for sensing physical changes in said coupler as the fluid level within the well rises and falls.

17. A method for determining fluid level within a well in which fluid level varies during the pumping of the fluid by a pump driven by a surface mounted motor, the well comprising a tubing system including an elongated conduit and a surface mounted support structure supporting the conduit, the support structure also supporting a drive rod extending downwardly into the conduit, the drive rod being rotatably driven by the surface mounted motor, the support structure further including a support column having a length and a diameter; the method comprises the steps of:

(a) sensing a physical change in the support column of the support structure; and (b) varying the speed of the motor upon sensing said physical change.

18. A method as defined in claim 17 in which the method comprises the steps of:

(a) sensing a change in the length of said support column of the support structure; and (b) stopping the motor upon sensing said change in the length of said support column.

19. A method as defined in claim 17 in which the method comprises the steps of:

(a) sensing a change in the diameter of said support column of the support structure; and (b) stopping the motor upon sensing the change in the diameter of said support column.

20. An apparatus for use in a well in which fluid level varies during the pumping of fluid from the well by a pump driven by a motor, the well being of the character having a drilled bore, containing a fluid, said apparatus comprising:

(a) a support structure including a support column having a length and a diameter;

(b) an elongated conduit connected to said support structure and extending downwardly within the bore into the fluid contained within the well and surrounding said conduit upon the rise and fall of fluid level within the well;

(c) a drive rod supported by said support structure and extending downwardly into said conduit, said drive rod being rotatably driven by the motor; and (d) sensor means for sensing physical changes in said support column and for generating at least one signal corresponding to a physical change in said support column as the fluid level within the well rises and falls.

21. An apparatus as defined in claim 20 further including controller means operably associated with said sensor means for controlling the speed of the motor in response to a physical change in said support column being sensed by said sensor means.

22. An apparatus as defined in claim 21 in which said sensor means comprises transducer means connected to said support column for sensing physical changes therein.

23. An apparatus as defined in claim 22 in which said transducer means measures changes in length of said support column.

* * * * *